United States Patent
Kang et al.

(10) Patent No.: US 10,593,943 B2
(45) Date of Patent: Mar. 17, 2020

(54) SURFACE TREATMENT METHOD FOR LITHIUM COBALT OXIDE, AND LITHIUM SECONDARY BATTERY COMPRISING SAME

(71) Applicant: DONGGUK UNIVERSITY INDUSTRY-ACADEMIC COOPERATION FOUNDATION, Seoul (KR)

(72) Inventors: Yong-mook Kang, Seoul (KR); Seul-hee Min, Anyang-si (KR); Mi-ru Jo, Seoul (KR)

( * ) Notice: Subject to any disclaimer, the term of this patent is extended or adjusted under 35 U.S.C. 154(b) by 47 days.

(21) Appl. No.: 15/553,614

(22) PCT Filed: Jan. 11, 2016

(86) PCT No.: PCT/KR2016/000242
§ 371 (c)(1),
(2) Date: Aug. 25, 2017

(87) PCT Pub. No.: WO2016/175426
PCT Pub. Date: Nov. 3, 2016

(65) Prior Publication Data
US 2018/0123128 A1    May 3, 2018

(30) Foreign Application Priority Data
Apr. 27, 2015    (KR) .................. 10-2015-0059057

(51) Int. Cl.
| | | |
|---|---|---|
| H01M 4/525 | (2010.01) | |
| H01M 4/505 | (2010.01) | |
| C01G 53/00 | (2006.01) | |
| H01M 4/131 | (2010.01) | |
| C01D 15/02 | (2006.01) | |
| H01M 10/0525 | (2010.01) | |

(52) U.S. Cl.
CPC ............ H01M 4/525 (2013.01); C01D 15/02 (2013.01); C01G 53/42 (2013.01); C01G 53/50 (2013.01); H01M 4/131 (2013.01); H01M 4/505 (2013.01); H01M 10/0525 (2013.01); C01P 2002/50 (2013.01); C01P 2002/54 (2013.01); C01P 2002/72 (2013.01); C01P 2002/82 (2013.01); C01P 2002/85 (2013.01)

(58) Field of Classification Search
CPC ..................................................... H01M 4/525
See application file for complete search history.

(56) References Cited

U.S. PATENT DOCUMENTS

2008/0113267 A1* 5/2008 Jouanneau ......... C01G 45/1221
429/224

FOREIGN PATENT DOCUMENTS

| JP | 2005-268017 | 9/2005 |
|---|---|---|
| JP | 2008-016235 | 1/2008 |
| KR | 10-2007-0102613 | 10/2007 |
| KR | 10-2012-0104854 | 9/2012 |
| KR | 10-2013-0091540 | 8/2013 |
| KR | 10-2013-0106610 | 9/2013 |
| KR | 10-2014-0048456 | 4/2014 |

OTHER PUBLICATIONS

English Specification of 10-2012-0012913.
English Specification of 10-2012-0028276.
English Specification of 10-2007-0102613.
English Specification of 10-2012-0104854.
English Abstract of 2005-268017.
English Specification of 10-2014-0048456.
English Abstract of 2008-016235.

* cited by examiner

Primary Examiner — Peter F Godenschwager
(74) Attorney, Agent, or Firm — Antonio Ha & U.S. Patent, LLC (57) ABSTRACT

The present invention relates to a surface treatment method for lithium cobalt oxide, comprising the steps of: (S1) mixing lithium cobalt oxide and an organic phosphoric acid compound; and (S2) heat treating and calcining the mixture prepared in step (S1). The surface treatment method of the present invention is simpler and has higher reproducibility than a conventional surface coating and doping technique, and can improve electrochemical characteristics by reinforcing the structural stability of lithium cobalt oxide. In addition, $LiCoO_2$ prepared by the surface treatment method of the present invention is structurally stable during charging/discharging and does not cause unnecessary phase transition, and thus has excellent lifetime characteristics.

13 Claims, 10 Drawing Sheets

Fig. 1

Lattice Parameters   a=2.8160(1)A, c=14.0526(1)A

| Atom | Site | x | y | z | Occupancy | B/A$^2$ |
|---|---|---|---|---|---|---|
| Li | 3b | 0.00000 | 0.00000 | 0.50000 | 1.000 | 1.61(2) |
| Co | 3a | 0.00000 | 0.00000 | 0.00000 | 1.000 | 1.14(2) |
| O | 6c | 0.00000 | 0.00000 | 0.2618(1) | 1.000 | 1.16(2) |

Fig. 2

Lattice Parameters   a=2.8158(1)A, c=14.0514(1)A

| Atom | Site | x | y | z | Occupancy | B/A² |
|---|---|---|---|---|---|---|
| Li | 3b | 0.00000 | 0.00000 | 0.50000 | 0.983(6) | 0.70(2) |
| P | 3b | 0.00000 | 0.00000 | 0.50000 | 0.017(6) | 0.70(2) |
| Co | 3a | 0.00000 | 0.00000 | 0.00000 | 1.000 | 0.14(2) |
| O | 6c | 0.00000 | 0.00000 | 0.2618(1) | 1.000 | 0.12(4) |

Fig. 3

| Sample | Li | Co | P |
|---|---|---|---|
| Pristine LiCoO$_2$ | 0.9258 | 1.0000 | 0 |
| Phosphidated LiCoO$_2$ | 0.9110 | 1.0000 | 0.0003 |

SURFACE TREATMENT METHOD FOR LITHIUM COBALT OXIDE, AND LITHIUM SECONDARY BATTERY COMPRISING SAME

CROSS-REFERENCE TO RELATED APPLICATIONS

This patent application is a national-stage application of PCT/KR2016/00242 which claims priority under 35 U.S.C. § 119 to Korean Patent Application No. 10-2015-0059057, filed on Apr. 27, 2015, in the Korean Intellectual Property Office, the disclosure of which is incorporated by reference herein in its entirety.

TECHNICAL FIELD

The present invention relates to a surface treatment method for lithium cobalt oxide, and more specifically, a surface treatment method for lithium cobalt oxide which is capable of enhancing electrochemical properties of lithium cobalt oxide and lithium cobalt oxide prepared using the method.

DISCUSSION OF RELATED ART

Recently increasing demand for mid- or large-sized apparatuses leads to the needs for energy storage devices having high energy density. Among others, lithium secondary batteries are under vigorous research thanks to their safety and high energy density.

However, lithium secondary batteries intended for large-sized apparatuses require further reinforced specifications and they should thus come forward with enhancement in safety and energy density.

A representative cathode material that meets the requirement of high energy density for mid- or large-sized batteries is layered $LiCoO_2$. $LiCoO_2$ is in wide use for its ease of mass production.

$LiCoO_2$ shows a high voltage of about 4V and has excellent charge/discharge efficiency and stable life characteristics thanks to no significant change in discharge voltage over time.

However, as going to 4.3V or a higher voltage, $LiCoO_2$ experiences a phase transition from rhombohedral to monoclinic, and its inter-layer interval expands, deteriorating its structural stability and electrochemical properties.

PRIOR TECHNICAL DOCUMENTS

Patent Documents (Patent Document 1) Korean Patent Application No. 10-2012-0012913
(Patent Document 2) Korean Patent Application No. 10-2012-0028276

SUMMARY

To resolve the problems with the prior art, the present invention aims to provide a cathode material for lithium secondary batteries that may be used at a high voltage by substituting phosphorus (P) for lithium (Li) sites present between $CoO_2$ layers through surface treatment on $LiCoO_2$, suppressing a structural deformation upon charge or discharge and a method for preparing the same.

To achieve the above objectives, according to the present invention, there is provided a surface treatment method for lithium cobalt oxide, comprising the steps of mixing lithium cobalt oxide with an organic phosphoric acid compound (S1) and calcinating the mixture prepared in step S1 through thermal treatment.

As the lithium cobalt oxide, $Li_xCoO_2$ (0.5<x≤1) or $Li_xNi_{1/3}Co_{1/3}Mn_{1/3}O_2$ (0.5<x≤1) may be used. Representatively and preferably, $LiCoO_2$ or $LiNi_{1/3}Co_{1/3}Mn_{1/3}O_2$ may be used.

Preferably, as the organic phosphoric acid compound, a one or a mixture of two or more selected from the group consisting of trioctylphosphine, trioctylphosphine oxide, triphenylphosphine, triphenylphosphate, parathion, and aminophosphonates may be used.

Preferably, 5 parts by weight to 20 parts by weight of the organic phosphoric acid compound are mixed with respect to 100 parts by weight of the lithium cobalt oxide.

Preferably, 0.0001 moles to 0.0010 moles of phosphorous (P) are substituted with respect to cobalt (Co) in the lithium cobalt oxide.

In step B, a temperature of the thermal treatment is preferably 300° C. to 700° C.

An atmosphere of the thermal treatment is preferably an inert gas atmosphere.

As the inert gas, a gas selected from among helium, nitrogen, argon, neon, and xenon may representatively be used.

According to the present invention, there is also provided lithium cobalt oxide prepared to using the surface treatment method.

Also provided according to the present invention is a lithium secondary battery including the lithium cobalt oxide as a cathode active material.

According to the present invention, there is also provided a method for preparing a cathode active material for a lithium secondary battery, comprising the steps of mixing lithium cobalt oxide with an organic phosphoric acid compound (S1) and calcinating the mixture prepared in step S1 through thermal treatment.

As the lithium cobalt oxide, $LiCoO_2$ may preferably be used.

Preferably, as the organic phosphoric acid compound, a one or a mixture of two or more selected from the group consisting of trioctylphosphine, trioctylphosphine oxide, triphenylphosphine, triphenylphosphate, parathion, and aminophosphonates may be used.

Preferably, 5 parts by weight to 20 parts by weight of the organic phosphoric acid compound are mixed with respect to 100 parts by weight of the lithium cobalt oxide.

In step B, a temperature of the thermal treatment is preferably 300° C. to 700° C.

According to the present invention, there is also provided a cathode active material including lithium cobalt oxide, wherein phosphorous is substituted for lithium in the lithium cobalt oxide.

As the lithium cobalt oxide, $Li_xCoO_2$ (0.5<x≤1) or $Li_xNi_{1/3}Co_{1/3}Mn_{1/3}O_2$ (0.5<x≤1) may be used.

Preferably, 0.0001 moles to 0.0010 moles of phosphorous (P) are substituted with respect to cobalt (Co) in the lithium cobalt oxide.

According to the present invention, the surface treatment method is a more straightforward way than existing surface coating or doping techniques, shows high reproducibility, and can reinforce the structural stability of lithium cobalt oxide, enhancing the electrochemical properties.

LiCoO$_2$ prepared by the surface treatment method according to the present invention has a stable structure because it is suppressed from charge/discharge phase transition and shows enhanced life characteristics because no unnecessary phase transition arises.

The surface treatment method according to the present invention enables easier mass production and uniform surface treatment. Further, the surface treatment method presents good electrochemical properties by changing the surface characteristics while preventing a deformation of the bulk. Lithium cobalt oxide prepared by the surface treatment method is expected to be used as a cathode material for next-generation lithium secondary batteries.

DETAILED DESCRIPTION OF EXEMPLARY EMBODIMENTS

Hereinafter, the present invention is described in detail and its relevant known configurations, structures, or functions may be omitted from the description of the present invention.

The terms or phrases used herein should be interpreted not in their typical or dictionary meanings but in consistence with the technical matters of the present invention.

The configurations shown and described with reference to the drawings are merely preferred embodiments of the present invention rather than representing all the technical spirits of the present invention and may thus be replaced by other various changes or equivalents thereof as of the time of filing the instant application.

According to the present invention, a surface treatment method for lithium cobalt oxide includes the step S1 of mixing lithium cobalt oxide with an organic phosphoric acid compound and the step S2 of calcinating the mixture prepared in step S1 through thermal treatment.

The surface treatment method for lithium cobalt oxide according to the present invention is described below step-by-step in detail.

First, lithium cobalt oxide is mixed with an organic phosphoric acid compound (S1).

As the lithium cobalt oxide, Li$_x$CoO$_2$ (0.5<x≤1) or Li$_x$Ni$_{1/3}$Co$_{1/3}$Mn$_{1/3}$O$_2$ (0.5<x≤1) may be used. Representatively and preferably, LiCoO$_2$ or LiNi$_{1/3}$Co$_{1/3}$Mn$_{1/3}$O$_2$ may be used.

As the organic phosphoric acid compound, one or a mixture of two or more selected from the group consisting of trioctylphosphine, trioctylphosphine oxide, triphenylphosphine, triphenylphosphate, parathion, and aminophosphonates may be used individually or in combination.

In mixing the lithium cobalt oxide with the organic phosphoric acid compound, 5 parts by weight to 20 parts by weight of the organic phosphoric acid compound are preferably added with respect to 100 parts by weight of the lithium cobalt oxide. However, the present invention is not limited thereto.

Where the amount of the organic phosphoric acid compound added exceeds 20 parts by weight, too excessive substitution of phosphorous may occur in the lithium cobalt oxide, causing a phase change or generation of impurities as well as a change in the reaction mechanism and negatively affecting the electrochemical properties. Where the amount of the organic phosphoric acid compound added is less than 5 parts by weight, uniform substitution of phosphorous over the entire surface of the lithium cobalt oxide may fail, resulting in poor surface treatment effects.

In the mole ratio for the lithium cobalt oxide prepared according to the present invention, it is preferred that 0.0001 to 0.0010 moles of phosphorous (P) are substituted with respect to 1 mole of cobalt (Co). However, the present invention is not limited thereto.

Where more than 0.0010 moles of phosphorous (P) are substituted for lithium, a phase change may arise. Substitution of less than 0.0001 moles of phosphorous (P) may fail to present a noticeable effect for structural stability.

Next, the mixture prepared in step S is calcinated through thermal treatment (S2).

Preferably, the thermal treatment is performed in an inert gas atmosphere at 300° C. to 700° C. for two hours to five hours.

Where the temperature of the thermal treatment is less than 300° C., trioctylphosphine may not completely be decomposed, and thus, an electrochemical reaction may be accompanied by a side reaction due to the residue. Where the temperature of the thermal treatment is 700° C. or more, particle coarsening may arise, reducing the area of reaction with an electrolyte upon an electrochemical reaction.

A gas selected from among, e.g., helium, nitrogen, argon, neon, and xenon is preferably used as the inert gas.

By the surface treatment method according to the present invention, phosphorous (P) may be substituted for lithium (Li) sites present between CoO$_2$ layers, enabling control in phosphate frameworks in the surface rather than in existing oxygen frameworks. Thus, a structural deformation may be suppressed from occurring upon charge or discharge, and the structural stability and electrochemical properties at a high voltage may be enhanced.

Accordingly, the surface treatment method for lithium cobalt oxide according to the present invention may be utilized as a method for producing a cathode active material for lithium secondary batteries.

Although preferred embodiments are provided for a better understanding of the present invention, it is apparent to one of ordinary skill in the art that the embodiments are merely an example, various changes or modifications may be made thereto without departing from the scope or technical spirit of the present invention, and such changes or modifications also belong to the scope of the appended claims.

EMBODIMENT 0.5 g of lithium cobalt oxide was mixed with 0.07 ml of trioctylphosphine, obtaining uniform slurry.

The slurry was then thermally treated at 600° C. in an inert gas atmosphere for two hours, obtaining lithium cobalt oxide with phosphorous bonded to the surface thereof.

Comparison Example 1

For comparison with the embodiment set forth above, lithium cobalt oxide (comparison example 1) was used which has not undergone the surface treatment.

Comparison Example 2

For comparison with the embodiment set forth above, lithium cobalt oxide thermally treated (comparison example 2) was used.

The thermal treatment was performed on lithium cobalt oxide at 600° C. for two hours while maintaining an argon (Ar) atmosphere.

<Test Example> X-Ray Diffractometry and Rietveld Refinement

Figure 1:
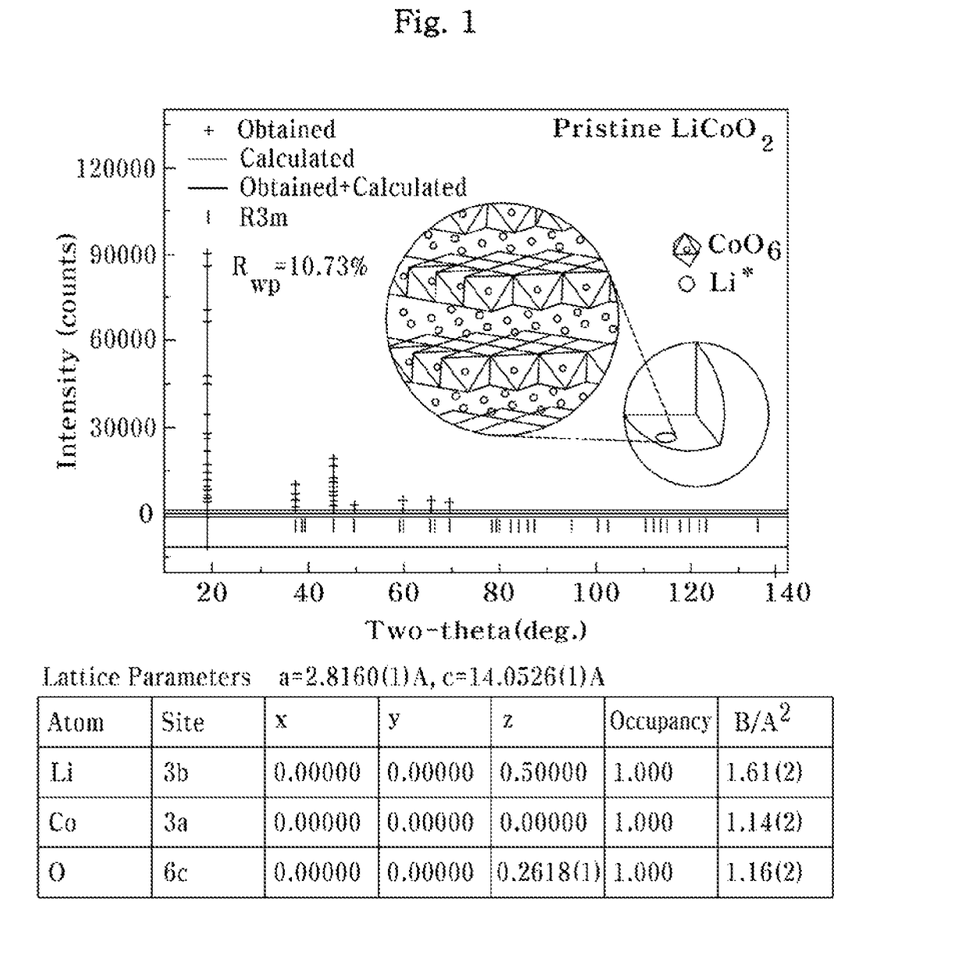
FIGS. 1 and 2 are graphs illustrating results of X-ray diffractometry on lithium cobalt oxide according to an embodiment and comparison example 1.
Figure 2:
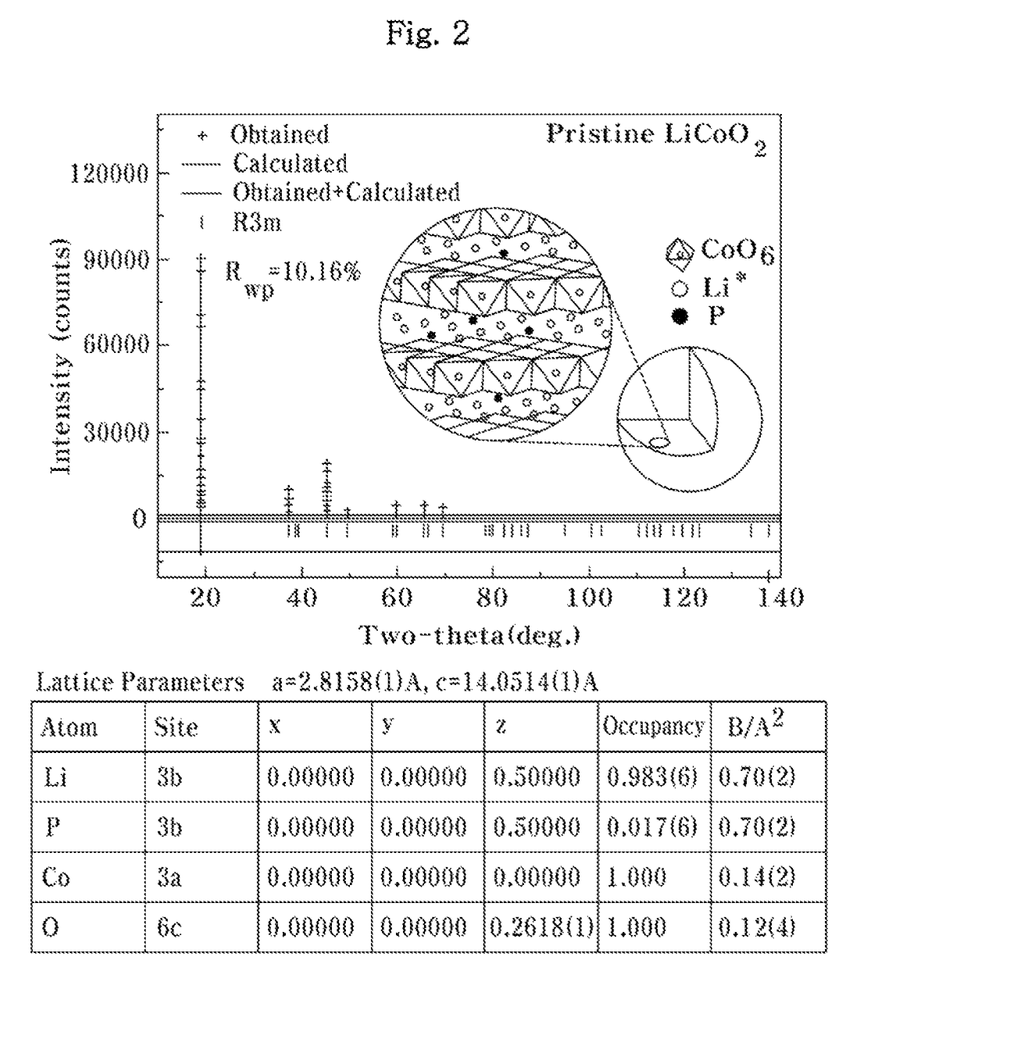

X-ray diffractometry was performed to specifically analyze the structure of lithium cobalt oxide according to comparison example 1, and its results were shown in FIGS. 1 and 2. Referring to FIGS. 1 and 2, the layered lithium cobalt oxide ($LiCoO_2$) of comparison example 1 showed distinctive peaks at 18.854 degrees (003), 37.396 degrees (006), 38.385 degrees (101), 39.063 degrees (102), 45.215 degrees (104), 49.427 degrees (106), 59.583 degrees (107), 65.417 degrees (108), 66.250 degrees (110), and 69.688 degrees (113).

Further, the lithium cobalt oxide ($LiCoO_2$) of the embodiment also showed distinctive peaks of layered lithium cobalt oxide ($LiCoO_2$) free of peaks of impurities as the lithium cobalt oxide of comparison example 1 did.

Rietveld refinement was used to verify the structure of the lithium cobalt oxide ($LiCoO_2$) using the X-ray diffractometry data. For the lithium cobalt oxide prepared according to the embodiment, it was verified by Rietveld refinement that phosphorous (P) was substituted for lithium (Li) ions present between $CoO_2$ layers. Accordingly, the inter-layer interval was reduced from 14.0526 to 14.0514 by the strong covalent bond between the substituted phosphorous and the oxygen present in the metal oxide ($CoO_2$) layer.

From the above results, the metal oxide ($CoO_2$) layers together form strong P—O covalent bonds and are thus considered to be structurally stable upon charge or discharge.

<Test Example> Inductively Coupled Plasma Atomic Emission Spectroscopy (ICP-AES)

Figure 3:
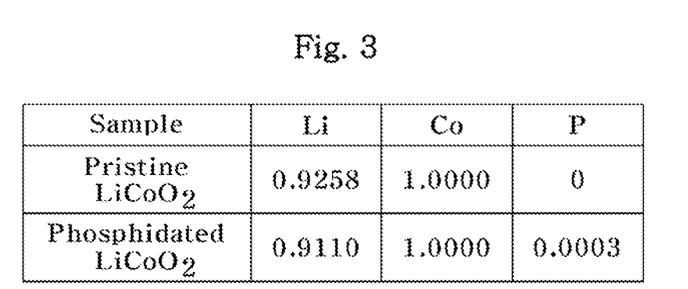
FIG. 3 is a view illustrating results of inductively coupled plasma atomic emission spectroscopy (ICP-AES) on lithium cobalt oxide according to the embodiment and comparison example 1.

ICP-AES was performed to analyze the elements of the lithium cobalt oxides according to the embodiment and comparison example 1, and its results were shown in FIG. 3.

As shown in FIG. 3, Li and Co corresponding to lithium cobalt oxide ($LiCoO_2$) in the embodiment and comparison example 1 were identified. Particularly for the lithium cobalt oxide ($LiCoO_2$) prepared according to the embodiment, P was identified as well.

With respect to one mole of cobalt (Co), the lithium cobalt oxide ($LiCoO_2$) prepared according to the embodiment was verified to contain 0.0003 moles of phosphorous (P).

From the above results, it was verified that a small amount of phosphorous (P) was substituted for some lithium sites in the lithium cobalt oxide ($LiCoO_2$) prepared according to the present invention.

<Test Example> Raman Spectroscopy

Figure 4:
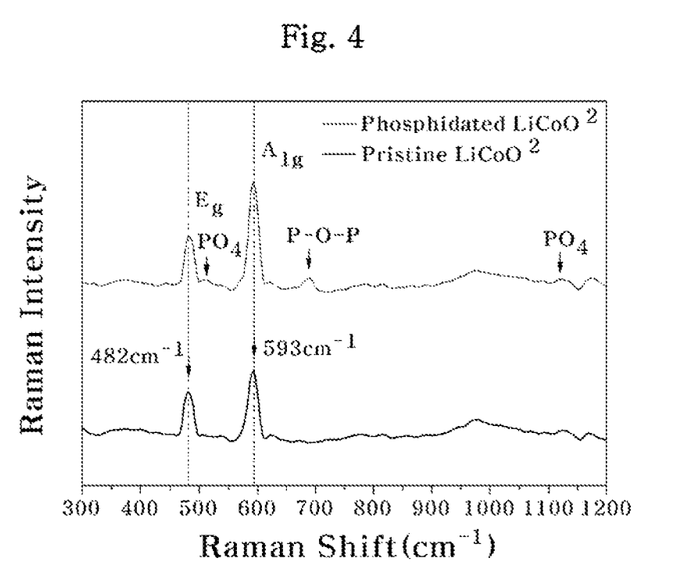
FIG. 4 is a view illustrating results of Raman spectroscopy on lithium cobalt oxide according to the embodiment and comparison example 1.

Raman spectroscopy was performed to analyze the surface structure of the lithium cobalt oxides according to the embodiment and comparison example 1, and its results were shown in FIG. 4.

As shown in FIG. 4, a spectrum capable of verifying a rhombohedron (R3m) structure was observed from both the lithium cobalt oxides ($LiCoO_2$) according to the embodiment and comparison example 1. This may be verified from $A_{1g}$ peaks representative of Co—O and $E_g$ peaks representative of O—Co—O dominantly occurring. However, in the case of the lithium cobalt oxide ($LiCoO_2$) prepared according to the embodiment, the inter-layer interval was reduced, so that the positions of the $A_{1g}$ and $E_g$ peaks were shifted to higher angles.

Also, the lithium cobalt oxide ($LiCoO_2$) prepared according to the embodiment showed distinctive peaks, which indicate the presence of phosphate ($PO_4$) on the surface, at 513 $cm^{-1}$ and 1120 $cm^{-1}$ and a distinctive peak, which indicates the presence of a phosphorous-oxygen bond, P—O—P, at 690 $cm^{-1}$.

From the above results, it was verified that phosphate ($PO_4$) frameworks consisting of phosphorous-oxygen bonds were formed on the surface of the lithium cobalt oxide ($LiCoO_2$) of the embodiment.

<Test Example> X-Ray Photoelectron Spectroscopy Using Depth Profiling (XPS Depth Profiling)

Figure 5:
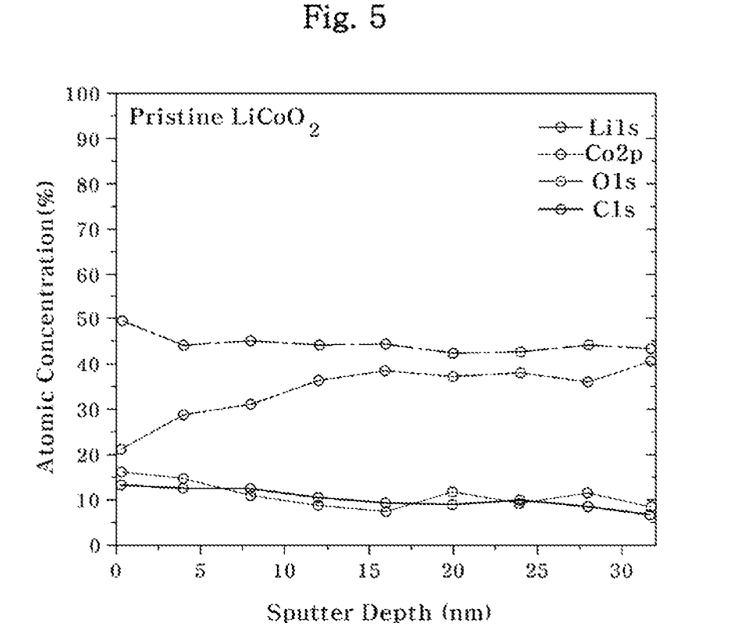
FIGS. 5 and 6 are views illustrating results of XPS depth profiling on lithium cobalt oxide according to the embodiment and comparison example 1.
Figure 6:
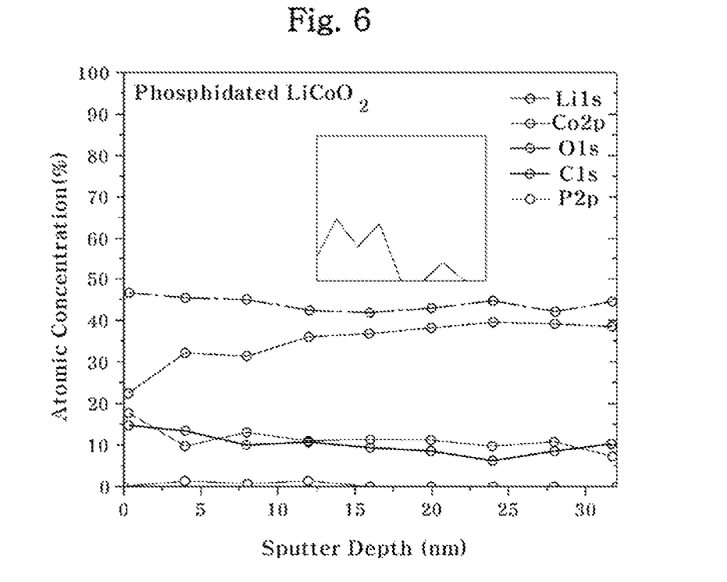

To analyze the phosphate ($PO_4$) framework formed by phosphorous (P) substituted on the surface of the lithium cobalt oxide ($LiCoO_2$) of comparison example 1, XPS depth profiling was performed, and its results were shown in FIGS. 5 and 6.

As shown in FIGS. 5 and 6, Li1s, Co2p, O1s, and C1s, which correspond to the lithium cobalt oxides ($LiCoO_2$) in the embodiment and comparison example 1, were verified. Particularly for the lithium cobalt oxide ($LiCoO_2$) prepared as per the embodiment. P2p was also verified.

It was verified that phosphorous (P) was substituted to the depth of about 20 nm from the surface of the lithium cobalt oxide ($LiCoO_2$) prepared as per the embodiment, forming phosphate ($PO_4$) frameworks.

From the above results, it was verified that the surface of the lithium cobalt oxide ($LiCoO_2$) prepared by the embodiment transformed from oxygen frameworks to $PO_4$ frameworks as phosphorous (P) was substituted for some lithium sites in the lithium cobalt oxide ($LiCoO_2$). Resultantly, the substituted phosphorous (P) is covalently bonded with the metal oxide layer ($CoO_2$), and it is expected to effectively suppress structural collapses that may arise due to charge or discharge.

<Test Example> Electrochemical Property Analysis (Charge/Discharge Properties, Coulomb Efficiency Analysis and Rate Performance Properties)

Cathode active materials prepared according to the embodiment of the present invention, containment environment, comparison example 1, and comparison example 2 were used to prepare their respective half cells. The half cells were charged and discharged at C/10 in a voltage range from 2.5V to 4.3V and a voltage range from 2.5V to 4.5V, and the results of measurement of charge/discharge properties were shown in FIGS. 7 and 8. Further, the half cells were charged and discharged within 100 cycles at C/10 in a voltage range from 2.5V to 4.3V and a voltage range from 2.5V to 4.5V, and the results of charge/discharge properties were shown in FIGS. 9 and 10. Also, the half cells were charged and discharged at C/10, C/2, 1C, 2C, 5C, and 10C in a voltage range from 2.5V to 4.3V and a voltage range from 2.5V to 4.5V, and the results of measurement of rate performance properties were shown in FIGS. 11 and 12 to observe variations in discharge capacity by variations in current density.

Figure 7:
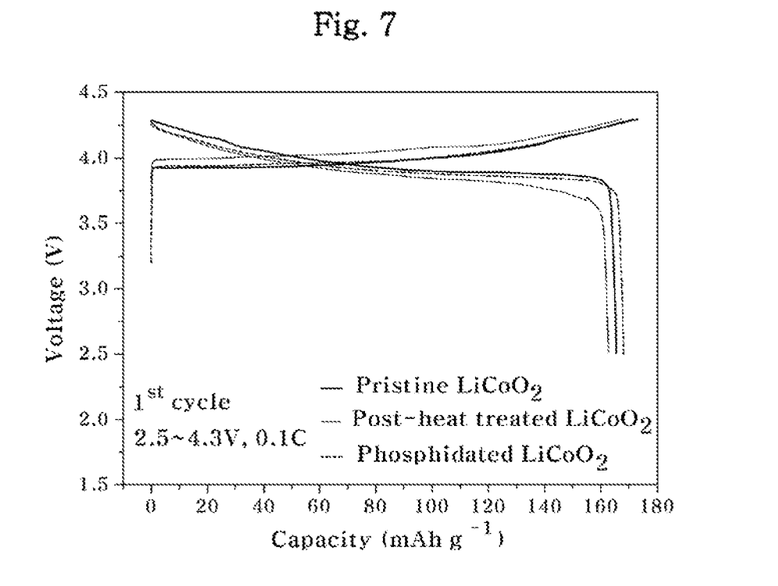
FIGS. 7 and 8 are views illustrating results of measurement of charge-discharge properties obtained by charging and discharging half cells prepared using lithium cobalt oxide as per the embodiment and comparison example 1 as a cathode active material at C/10 in a voltage range from 2.5V to 4.3V and a voltage range from 2.5V to 4.5V.

Referring to FIG. 7, the lithium cobalt oxide ($LiCoO_2$) prepared by the embodiment of the present invention showed the same oxidation/reduction reaction as that of comparison example 1 in the voltage range from 2.5V to 4.3V. Further, comparison example 2, which simply performs thermal treatment on lithium cobalt oxide ($LiCoO_2$) in an inert gas (Ar) atmosphere, also showed the same oxidation/reduction reaction.

Figure 8:
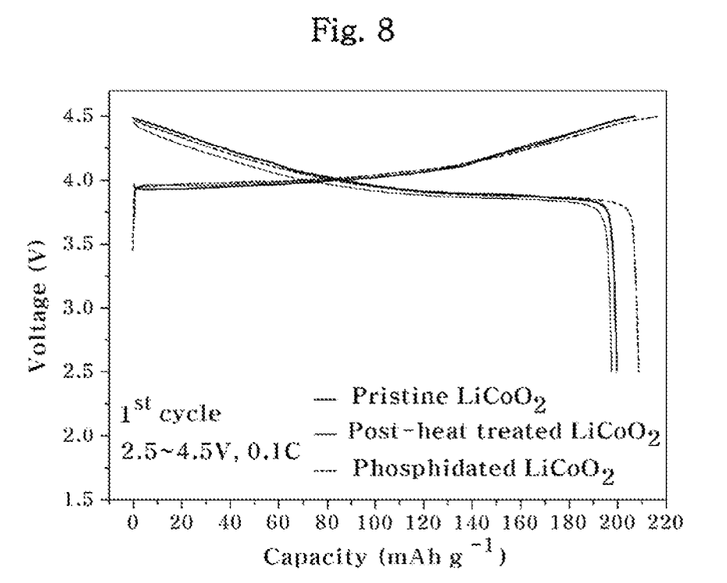

Referring to FIG. 8, the lithium cobalt oxide ($LiCoO_2$) prepared by the embodiment of the present invention showed the same oxidation/reduction reaction as that of comparison example 1 in the voltage range from 2.5V to 4.5V. Further, comparison example 2, which simply performs thermal treatment on lithium cobalt oxide ($LiCoO_2$) in an inert gas (Ar) atmosphere, also showed the same oxidation/reduction reaction.

Figure 9:
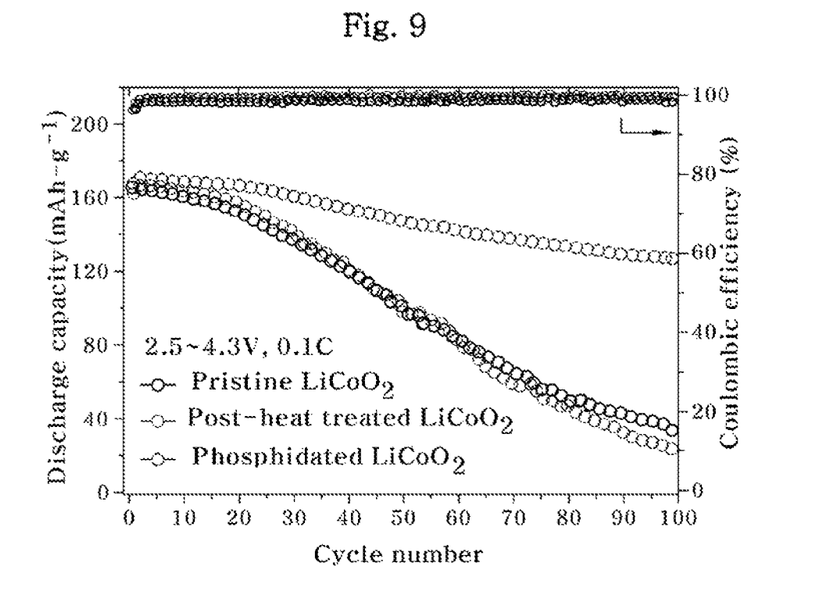
FIGS. 9 and 10 are views illustrating results of measurement of charge-discharge properties obtained by charging and discharging half cells prepared using lithium cobalt oxide as per the embodiment and comparison example 1 as a cathode active material within 100 cycles at C/10 in a voltage range from 2.5V to 4.3V and a voltage range from 2.5V to 4.5V.

Referring to FIG. 9, in a voltage range from 2.5V to 4.3V, a lithium ion half-cell prepared using, as its cathode material, lithium cobalt oxide ($LiCoO_2$) prepared by the embodiment of the present invention, when charged and discharged at C/10, showed a capacity retention ratio of 75.4% after 100 cycles and revealed a better retention ratio than that of the lithium cobalt oxides ($LiCoO_2$) prepared by comparison example 1 and comparison example 2.

Figure 10:
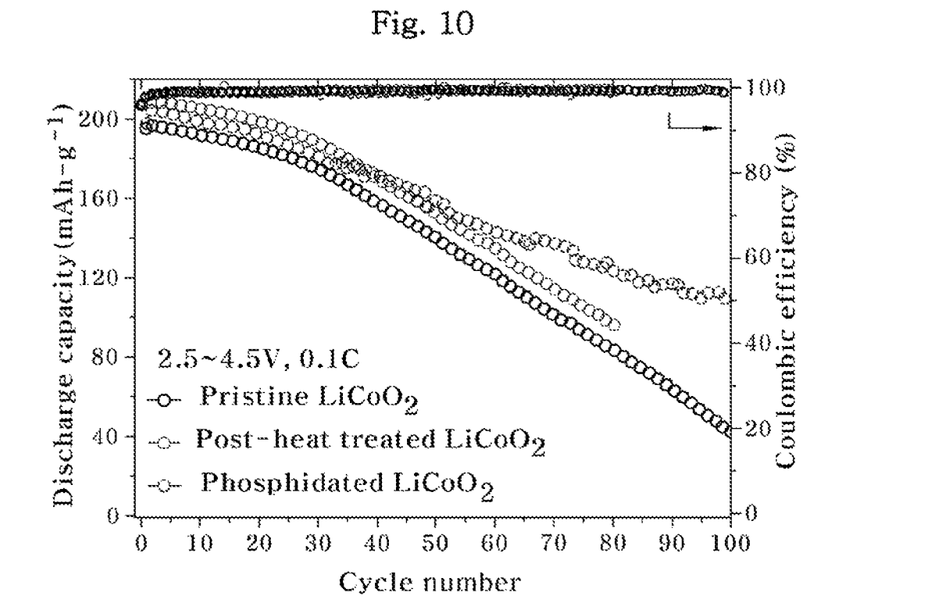

Referring to FIG. 10, in a voltage range from 2.5V to 4.5V, a lithium ion half-cell prepared using, as its cathode material, lithium cobalt oxide ($LiCoO_2$) prepared by the embodiment of the present invention, when charged and discharged at C/10, showed an enhanced capacity retention ratio of 58% after 100 cycles than that of the lithium cobalt oxides ($LiCoO_2$) prepared by comparison example 1 and comparison example 2.

Figure 11:
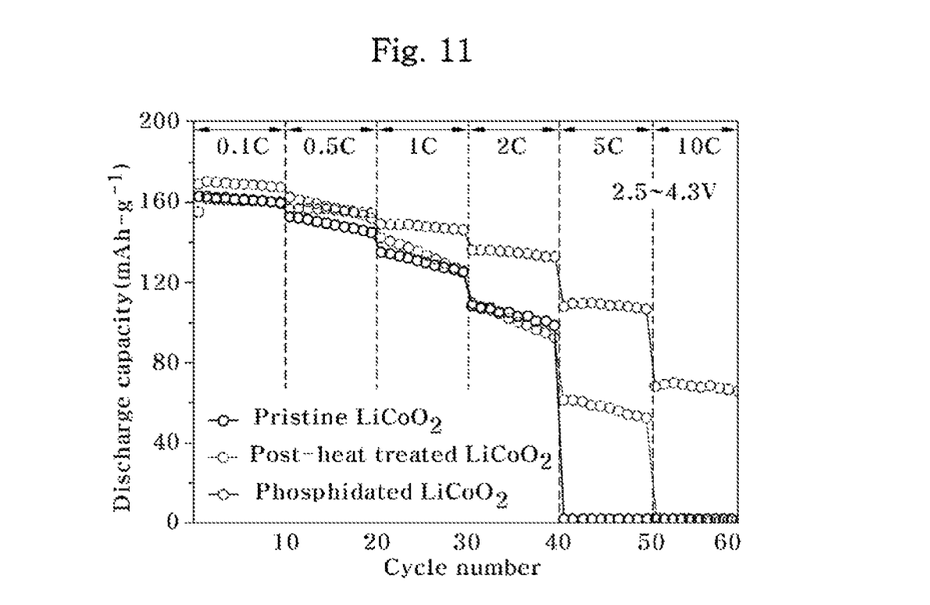
FIGS. 11 and 12 are views illustrating results of assessment of rate performance properties obtained by charging and discharging half cells prepared using lithium cobalt oxide as per the embodiment and comparison example 1 as a cathode active material at C/10, C/2, 1C, 2C, 5C, and 10C in a voltage range from 2.5V to 4.3V and a voltage range from 2.5V to 4.5V to observe variations in discharge capacity as per variations in current density.

Referring to FIG. 11, in a voltage range from 2.5V to 4.3V, a lithium ion half-cell prepared using, as its cathode material, lithium cobalt oxide ($LiCoO_2$) prepared by the embodiment of the present invention showed a capacity retention ratio of 54% even at 10C. which is a high current density as compared with C/10, and it was verified that comparison example 1 and comparison example 2 showed a significant reduction in capacity or a failure in the cell as the current density increases from C/10 to 10C.

Figure 12:
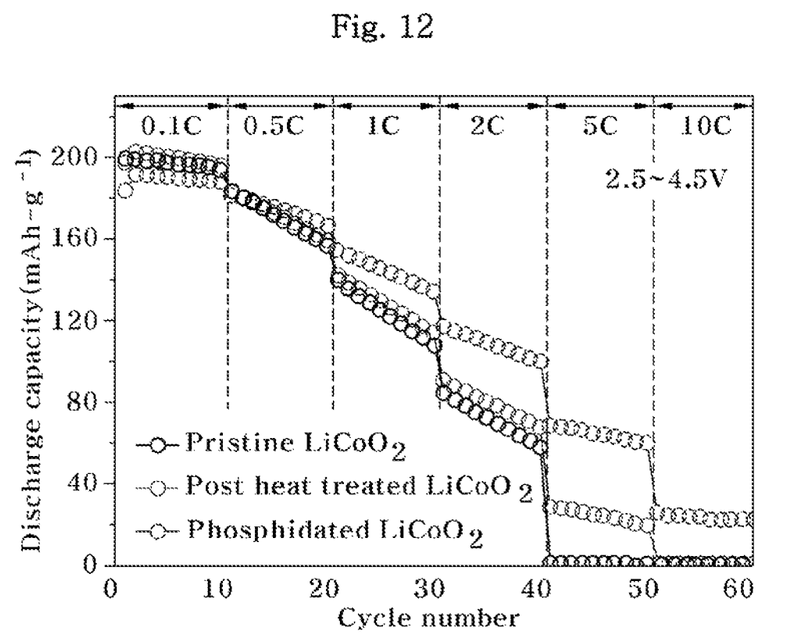

Referring to FIG. 12, in a voltage range from 2.5V to 4.5V, it was verified that a lithium ion half-cell prepared using, as its cathode material, lithium cobalt oxide ($LiCoO_2$) prepared by the embodiment of the present invention was driven even when the current density increases from C/10 to 10C, but comparison example 1 and comparison example 2 showed a significant reduction in capacity or a failure in the cell as the current density increases from C/10 to 10C.

From the above results, it was verified that, in the lithium cobalt oxide ($LiCoO_2$) prepared according to the present invention, phosphorous (P) was substituted for lithium (Li) sites present between $CoO_2$ layers and that the substituted phosphorous transitioned part of the surface from oxygen frameworks to $Po_4$ frameworks, suppressing an unnecessary phase transition at a high voltage upon charge or discharge and reducing side reaction with the electrolyte to present good life and rate performance properties.

<Test Example> Ex-Situ X-Ray Diffractometry (Ex-Situ XRD)

Figure 13:
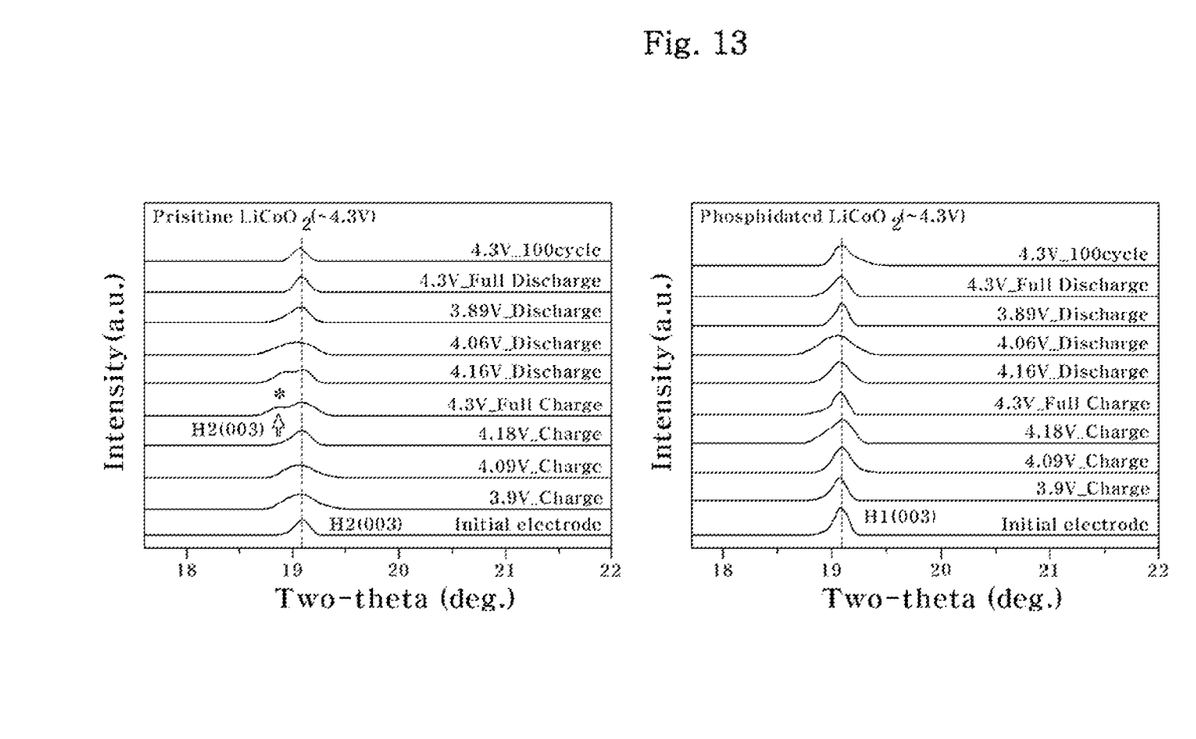
FIGS. 13 and 14 are views illustrating results of ex-situ x-ray distraction (XRD) to specifically analyze per-voltage variations in crystalline structure of lithium cobalt oxide as per the embodiment and comparison example 1.
Figure 14:
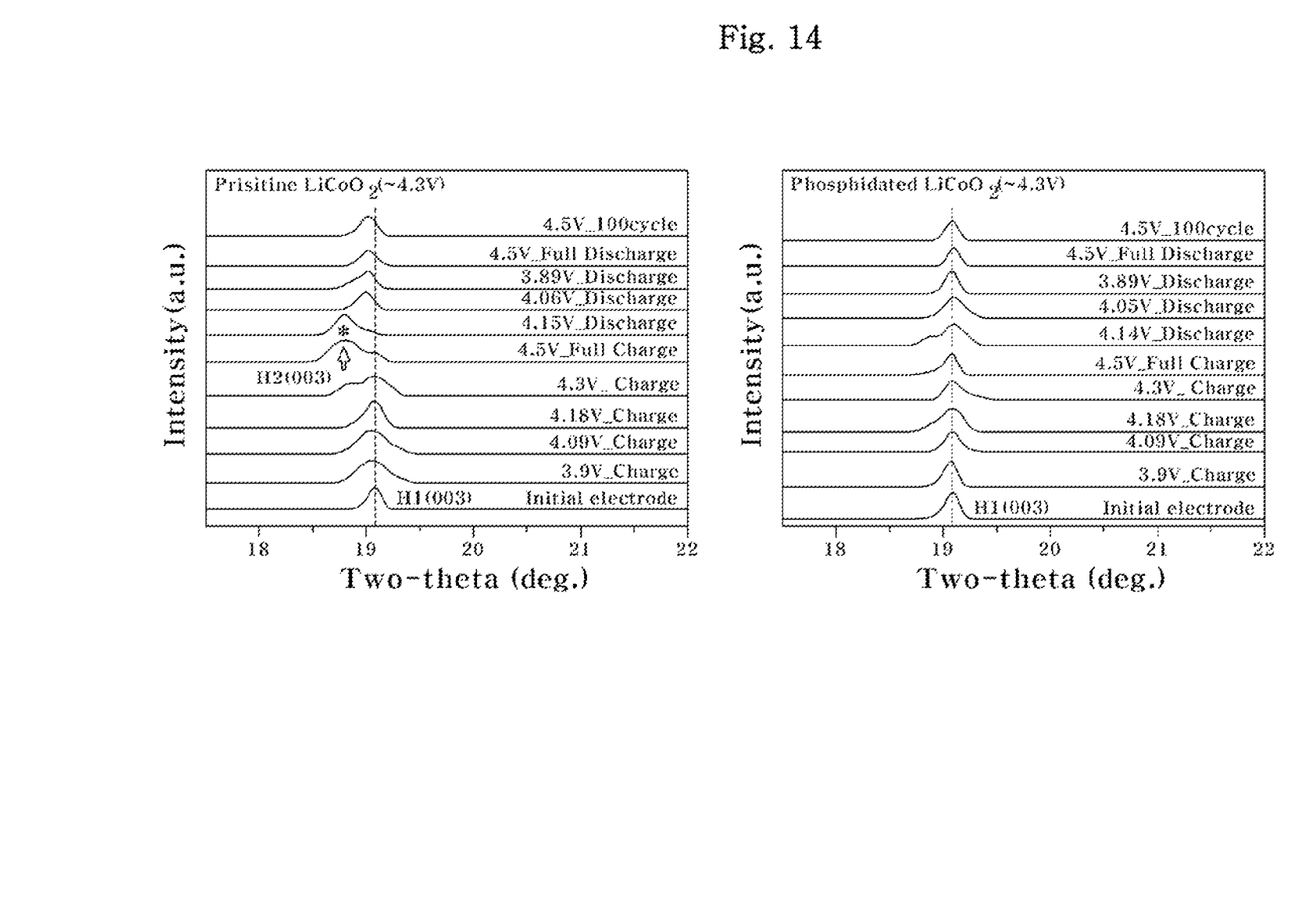

To specifically analyze per-voltage variations in crystalline structure of the lithium cobalt oxides ($LiCoO_2$) as per the embodiment and comparison example 1, ex-situ XRD was performed, and its results were shown in FIGS. 13 and 14. The expanded section between 18 degrees and 23 degrees for both the lithium cobalt oxide ($LiCoO_2$) of comparison example 1 and the lithium cobalt oxide ($LiCoO_2$) of the embodiment were shown as well.

FIG. 13(a) shows the results of measurement per voltage in a voltage range from 2.5V to 4.3V, and FIG. 10(b) shows the results of measurement per voltage in a voltage range from 2.5V to 4.5V.

As shown in FIG. 13(a), in comparison example 1, a distinctive peak was shown which indicates an H1 phase near 19 degrees, and when charged up to 4.3V, a distinctive peak indicating a new H2 phase was shown near 18.8 degrees. Further, like in comparison example 1, the lithium cobalt oxide ($LiCoO_2$) prepared by the embodiment showed a distinctive peak indicating an H1 phase near 19 degrees, and even when charged up to 4.3V, no new peak was shown.

Referring to FIG. 14(b), it was verified that the distinctive peak indicating the H2 phase near 18.8 degrees which was shown when the lithium cobalt oxide ($LiCoO_2$) as per comparison example 1 was charged up to 4.3V was more clearly shown when charged up to 4.5V and that when discharged back to 2.5V, no transition was made back to the H1 phase. Unlike this, it was verified that when the lithium cobalt oxide ($LiCoO_2$) by the embodiment of the present invention was charged up to 4.5V, no new distinctive peak was observed other than the H1 phase, and when discharged back to 2.5V, remained in the H1 phase.

From the above results, it was verified that the lithium cobalt oxide according to the embodiment of the present invention remained stable in structure through the surface treatment upon charge or discharge and was suppressed from unnecessary phase transition.

What is claimed is:

1. A surface treatment method for lithium cobalt oxide, comprising the steps of:
    mixing lithium cobalt oxide with an organic phosphoric acid compound (S1); and
    calcinating the mixture prepared in step S1 through thermal treatment.

2. The surface treatment method of claim 1, wherein the lithium cobalt oxide is $Li_xCoO_2$ (0.5<x≤1) or $Li_xNi_{1/3}Co_{1/3}Mn_{1/3}O_2$ (0.5<x≤1).

3. The surface treatment method of claim 1, wherein the organic phosphoric acid compound is one or a mixture of two or more selected from the group consisting of trioctylphosphine, trioctylphosphine oxide, triphenylphosphine, triphenylphosphate, parathion, and aminophosphonates.

4. The surface treatment method of claim 1, wherein 5 parts by weight to 20 parts by weight of the organic phosphoric acid compound are mixed with respect to 100 parts by weight of the lithium cobalt oxide.

5. The surface treatment method of claim 1, wherein 0.0001 moles to 0.0010 moles of phosphorous (P) are substituted with respect to cobalt (Co) in the lithium cobalt oxide.

6. The surface treatment method of claim 1, wherein a temperature of the thermal treatment is 300° C. to 700° C.

7. The surface treatment method of claim 1, wherein an atmosphere of the thermal treatment is an inert gas atmosphere.

8. The surface treatment method of claim 7, wherein the inert gas is a gas selected from among helium, nitrogen, argon, neon, and xenon.

9. A method for preparing a cathode active material for a lithium secondary battery, the method comprising the steps of:
    mixing lithium cobalt oxide with an organic phosphoric acid compound (S1); and
    calcinating the mixture prepared in step S1 through thermal treatment.

10. The method of claim 9, wherein the lithium cobalt oxide is $LiCoO_2$.

11. The method of claim 9, wherein the organic phosphoric acid compound is one or a mixture of two or more selected from the group consisting of trioctylphosphine, trioctylphosphine oxide, triphenylphosphine, triphenylphosphate, parathion, and aminophosphonates.

12. The method of claim 9, wherein 5 parts by weight to 20 parts by weight of the organic phosphoric acid compound are mixed with respect to 100 parts by weight of the lithium cobalt oxide.

13. The method of claim 9, wherein a temperature of the thermal treatment is 300° C. to 700° C.

* * * * *